INVENTOR.
WILLIAM P. BANKS
BY
ATTORNEY

INVENTOR.
WILLIAM P. BANKS

ATTORNEY

United States Patent Office 3,428,532
Patented Feb. 18, 1969

3,428,532
METHOD FOR IDENTIFYING METALS
AND ALLOYS
William P. Banks, Ponca City, Okla., assignor to Continental Oil Company, Ponca City, Okla., a corporation of Delaware
Filed Feb. 6, 1964, Ser. No. 343,041
U.S. Cl. 204—1                                      5 Claims
Int. Cl. B01k 3/00

ABSTRACT OF THE DISCLOSURE

A method for quantitatively identifying metals and alloys comprising making the metal specimen an electrode and obtaining a polarization curve and weight loss value for said metal specimen at a given passive potential region which is determined from said polarization curve; repeating the above series of steps with metals and alloys of known composition; and matching the polarization curves and weight loss values of the unknown sample with those obtained from the metal or alloy of known composition.

---

This invention relates to a method for identifying metals and alloys. More particularly, the present application relates to a method for qualitatively and quantitatively identifying alloys without destruction of the metal or alloy and in a relatively rapid and accurate manner. In one of its more specific though nonlimiting aspects, the present invention relates to a method for distinguishing between closely related members of a family of alloys, such as the stainless steels.

It is well known that a particular metal can frequently be identified by measuring its electrical potential in a certain type of electrolyte with respect to a known reference potential. The static potential values thus obtained may be compared to a chart of known potentials for various metals to aid in identifying the metal. Many of the metals and alloys of metals, however, have substantially similar natural potentials, or static potentials as measured with respect to a known reference, so that identification of the metals, and particularly of alloy compositions, is difficult and frequently cannot be accomplished with a high degree of accuracy.

It has also been well known heretofore that potentiostatic polarization curves in which electromotive force is plotted against current density according to the relationship $i=f(E)$ (current density equals a function of electromotive force) may be used to provide information regarding the corrosion characteristics of metals and alloys when they are immersed in a particular corrosive electrolyte and made either the anode or the cathode in an electrolytic circuit. Curves of this type have been employed, for example, for the purpose of gathering information as to how a composition of an alloy may be altered to improve the corrosion resistance of the alloy, or how a particular electrolyte may be varied in order to reduce the extent to which a particular alloy is corroded by contact therewith. The polarizaton curves have also been beneficial in designing electrical and electronic control circuitry for anodically passivating metal surfaces and maintaining them in the noncorroding condition when in contact with a particular electrolyte. In general, polarization curves provide quantitative information on the tendency of a metal to undergo corrosion or to be passivated which cannot be obtained from static measurements of potential, which measurements supply only a qualitative indication of corrosion behavior, and usually provide only a qualitative or at best, roughly quantitative, indication of the composition of the metal or alloy.

I have now determined that potentiostatic polarization curves may be used to quantitatively identify alloys with a relatively high degree of specificity, and that this technique can be utilized to distinguish between closely related members of a family of alloys, such as the stainless steels. More specifically, I have observed that in a particular or specific electrolyte and under controlled and repeatable electrolytic reaction conditions, each system of metals or alloys has a characteristic anodic and/or cathodic potentiostatic polarization curve which permits it to be distinguished from other alloys on the basis of differences which exist between its particular polarization curve and the polarization curve of such other alloys. In other words, the polarization curve of an alloy can be used to identify the alloy and to provide useful quantitative information as to its constituents.

Broadly, the present invention comprises making an unknown alloy or metal one of the electrodes in an electrochemical cell. There is then obtained an anodic and/or cathodic polarization curve for the tested material. A curve of this type is obtained by changing the voltage (hereinafter designated by the symbol $V_d$) applied across the electrodes of the electrochemical cell, and measuring the potential (hereinafter designated by the symbol $V_R$) of the alloy electrode relative to a constant, known potential, and also measuring, as current density at the alloy electrode, the current passed between the electrodes during the time the cell potential is varied. The measured potential $V_R$ and current density values are then plotted or recorded to obtain the polarization curve. The electrolyte which is employed, its temperature the pressure in the electrolytic cell and the time taken to obtain the polarization curve are predetermined and are substantially identical to those which have been used in obtaining a set or family of known or standard polarization curves for metals and alloys of known composition. The known or standard curves are then matched with the polarization curve of the unknown alloy with such characteristics of polarization curves as (a) the "natural or self potential" and natural current density, (b) the "Flade" arrest potential, (c) the passive potential region, (d) the transpassive potential region of the curves being compared and (e) the magnitude of the current density in the various potential regions. My investigations have indicated that these characteristics of polarization curves differ in one or more instances in the case of each specific alloy so that the composition of the alloy may be identified by observation of the particular characteristics of its polarization curve.

In a modified embodiment of the invention, a further indication of the identity of the metal or alloy is obtained by measuring the total weight of the metal or coupon which is lost through corrosion when the metal or alloy is made an electrode in an electrochemical cell. In obtaining the data, a polarization curve for the unknown material is first obtained in the manner hereinbefore described. A coupon of the unknown material of predetermined size is then made an electrode in the same electrolyte and under the same conditions as used in obtaining the polarization curve. The coupon is brought to a substantially passive state by adjustment of its potential relative to a constant known potential, and maintained in this substantially passive state at a constant potential for an extended period of time. At the end of this time, the total weight of the metal or alloy coupon which has been lost through corrosion is measured. The current density at the coupon-electrode is also measured. These values (weight loss and final current density) have been found to be characteristic of metals and alloys and may be compared to known or standard values in order to identify the particular unknown material of interest. They are particularly significant when used in combination with the polarization curves.

From the foregoing description of the invention, it will have become apparent that it is a major object of the present invention to provide a novel, accurate method for identifying metals and alloys.

More particularly, it is an object of the present invention to provide a method for nondestructively analyzing metals and alloys in an accurate and expedient manner.

Another object of the present invention is to distinguish between closely related members of families of alloys, such as the stainless steels, so that the composition of a particular alloy may be identified with a relatively high degree of accuracy.

In addition to the described objects and advantages of the invention, additional advantageous features of the invention will become apparent when the following detailed description of the invention is read in conjunction with the accompanying drawings which illustrate various aspects of the invention and the results obtained in its practice.

Figure 3:
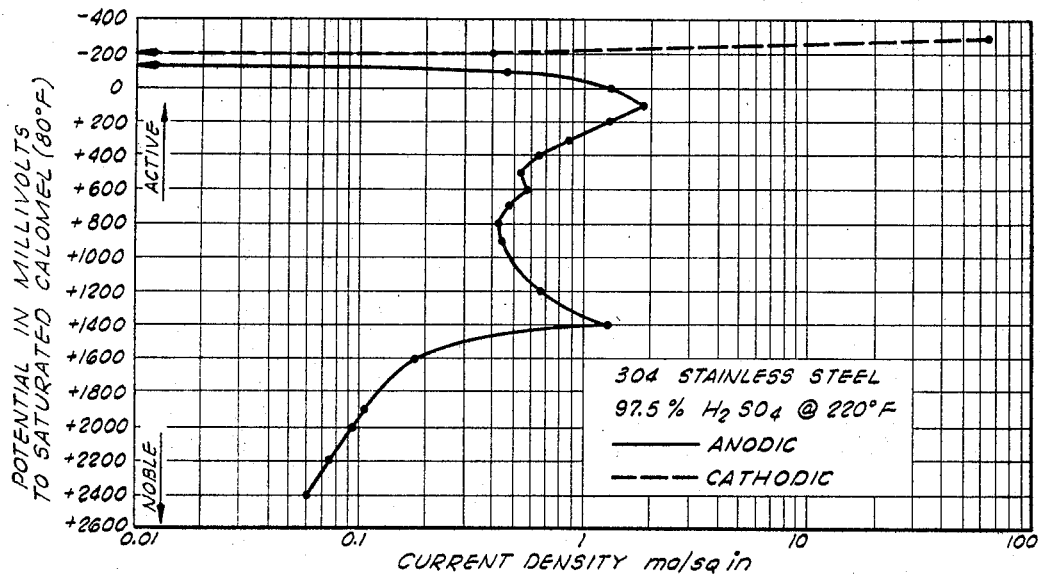
Figure 4:
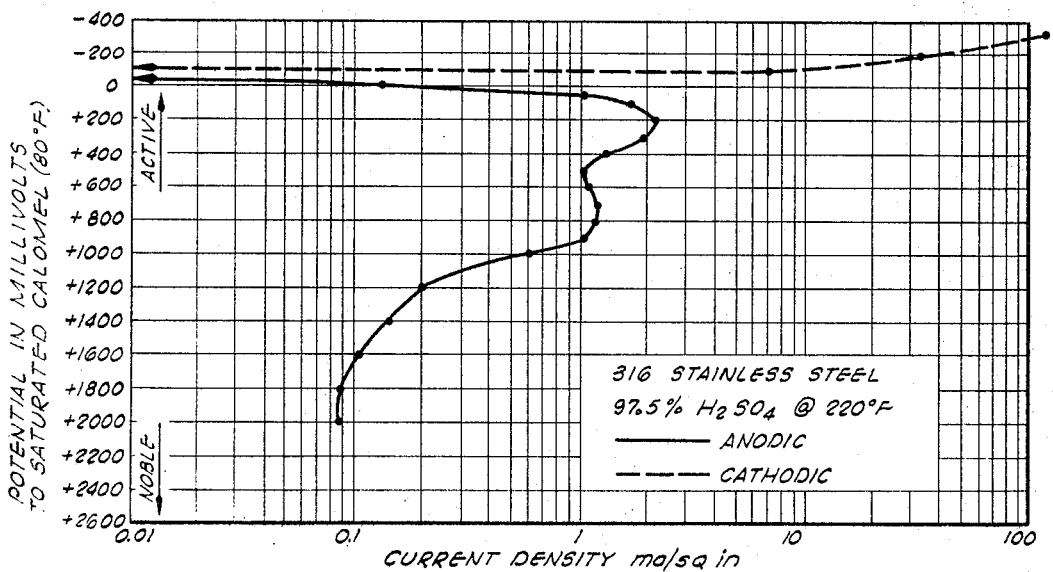
Figure 5:
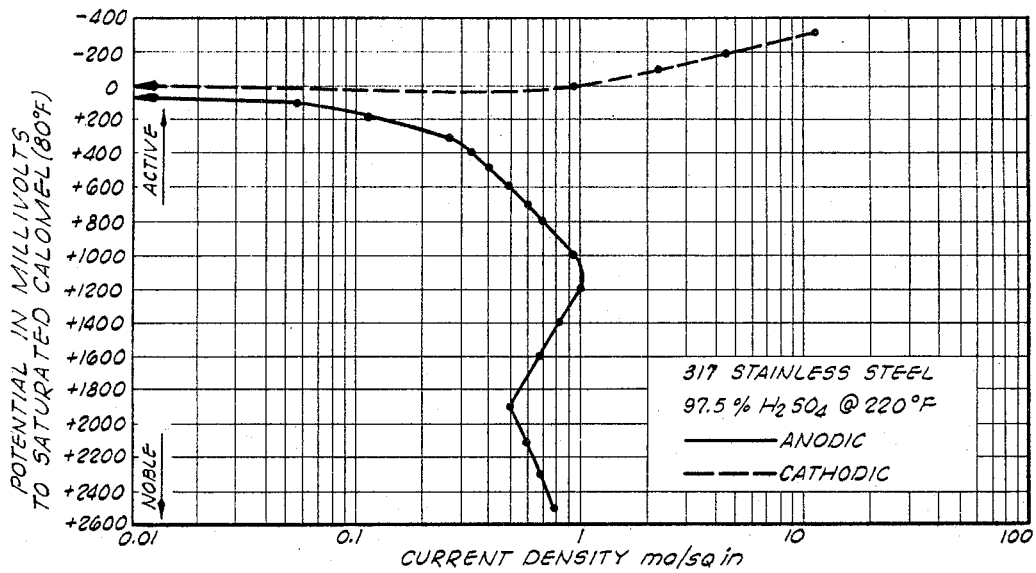

FIGURES 3, 4 and 5 are polarization curves obtained for three 300 series stainless steels in contact with approximately 97.5 percent by weight concentrated sulfuric acid maintained at a temperature of 220° F.

Figure 6:
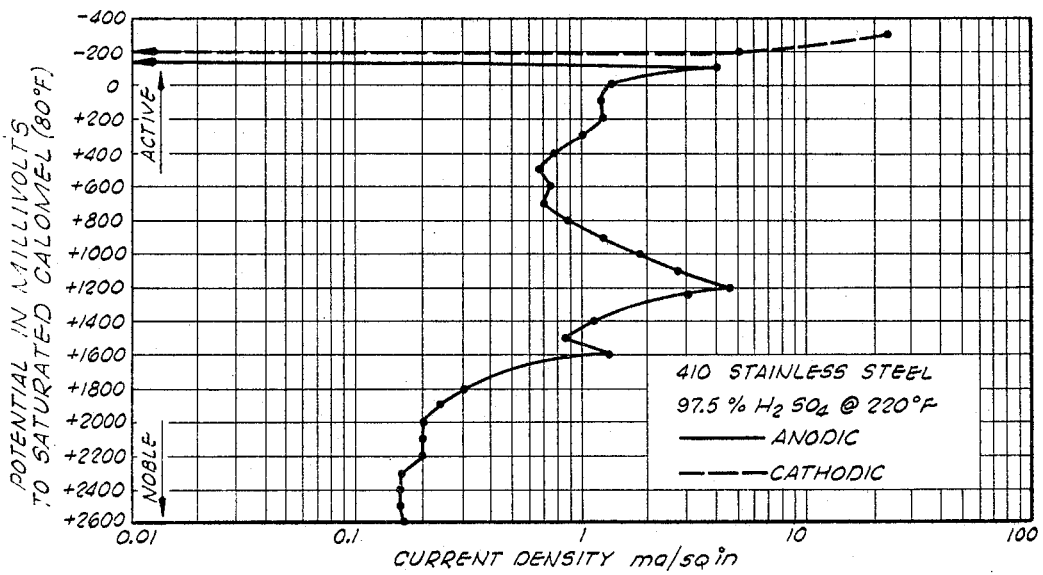
Figure 7:
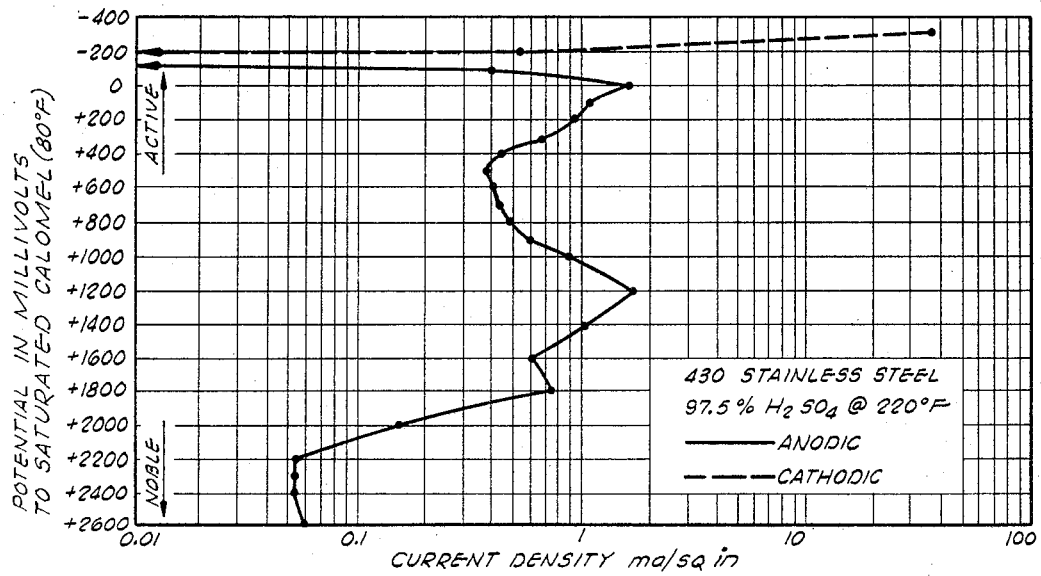

FIGURES 6 and 7 are polarization curves for two 400 series stainless steels in contact with 97.5 percent by weight concentrated sulfuric acid at 220° F.

Figure 8:
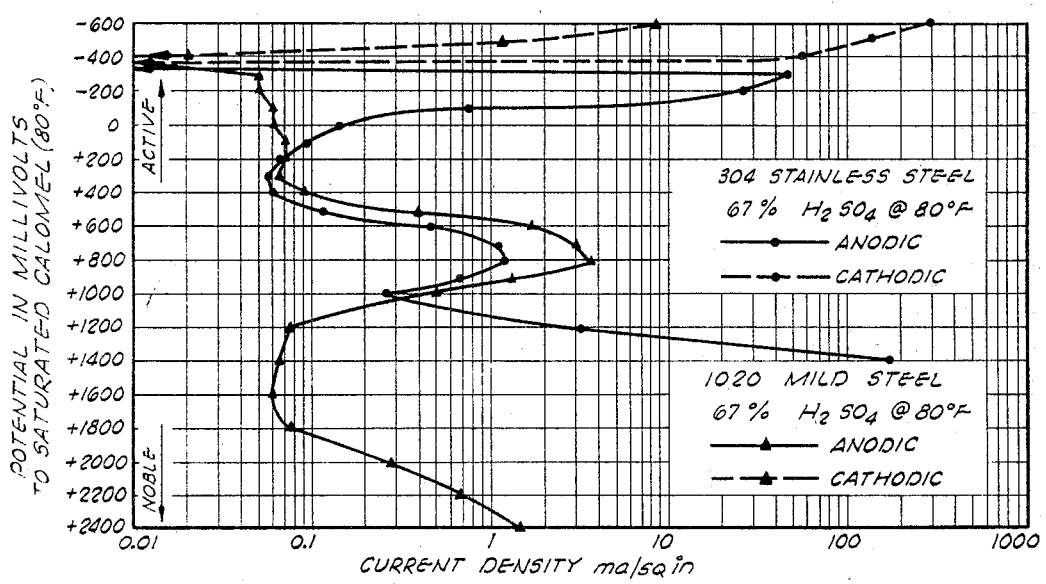

FIGURE 8 is a graph of two superimposed polarization curves obtained for 1020 mild carbon steel and for 304 stainless steel in contact with 67 percent by weight sulfuric acid maintained at a temperature of approximately 80° F.

Figure 1:
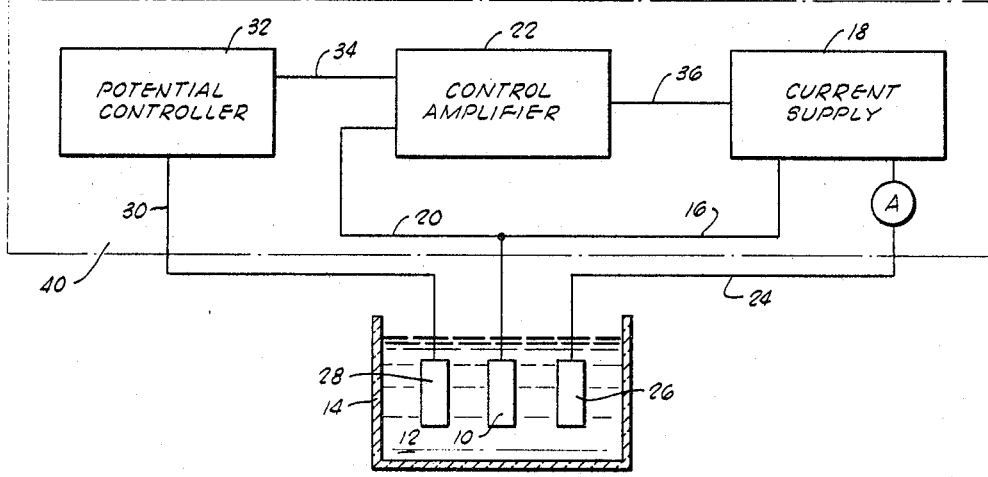
FIGURE 1 is a schematic illustration of electrochemical apparatus which is generally utilized to obtain polarization curves and weight loss data on metals and alloys which are to be identified or distinguished in accordance with the method of the present invention.

Referring first to FIGURE 1 of the drawings, there is here schematically illustrated an apparatus which may be used for obtaining polarization curves employed in the practice of the present invention. A coupon 10 of the metal or alloy to be identified is immersed in a corrosive electrolyte 12 contained in a suitable vessel 14. The coupon 10 is connected by an electrical lead 16 to one side of a direct current supply 18, and by lead 20 to a control amplifier 22. The other side of the current supply 18 is connected through electrical lead 24 to an inert power electrode 26. A reference electrode 28 of constant potential is immersed in the electrolyte 12 and is connected by an electrical lead 30 to a potential controller 32. The potential controller 32 is connected by electrical lead 34 to the control amplifier 22. A control signal is developed by the control amplifier 22 and transmitted to the current supply 18 via electrical lead 36. The potential controller, control amplifier and current supply, 32, 22 and 18, respectively, together constitute a potentiostat which functions to maintain predetermined potential differences $V_c$ between the unknown metal or alloy coupon 10 and the reference electrode 28 by regulating the current flow between the coupon 10 and the inert electrode 26.

In the operation of the FIGURE 1 apparatus to obtain a polarization curve which is characteristic of the metal or alloy in the coupon 10, a potential difference $V_c$ which it is desired to establish between the coupon 10 and the reference electrode 28 is preset into the potentiostat constituted by the potential controller 32. The actual potential difference $V_R$ between the reference electrode 28 and the coupon 10 is then automatically electrically balanced against the preset potential difference. The difference or error signal which results from this balancing of actual potential difference $V_R$ against the preset potential difference $V_c$ is fed into the control amplifier 22 which develops an amplified control signal which is transmitted to the circuitry of the current supply 18. The circuitry of the current supply 18 can include a saturable core reactor (not shown) which can be used to vary the current output of the current supply 18. The amount of current developed by the current supply 18 and passed between the inert electrode 26 and the coupon 10 is that which is necessary to attain a potential difference $V_R$ between the coupon 10 and the reference electrode 28 which is equal to the preselected potential difference $V_c$ set into the potential controller 32.

The polarization curve is developed as the preset potential difference $V_c$ which is set into the potential controller 32 is periodically changed. After allowing the actual potential difference $V_R$ between the coupon 10 and reference electrode 28 to be brought into agreement with the preset potential $V_c$ by the system in the manner described in the preceding paragraph, the preset (and equivalent actual) potential difference $V_c$ thus obtained is noted, along with the current density obtaining at this time at the coupon 10. A polarization curve of the potential difference $V_c$ (or $V_R$) versus current density is then plotted. I have now discovered that such polarization curves are characteristic of the metal or alloy of which the coupon 10 is constructed.

A description of the construction and method of operating a suitable potential controller or potentiostat which may be used to obtain polarization curves is set forth in the article "Anodic Corrosion Control" by Locke, Hutchison and Conger at pages 50–55 in vol. 56, No. 11, November 1960, Chemical Engineering Progress, in an article appearing at pages 72–77 of I and EC Process Design and Development, vol. 2, January 1963 (Harwood, Hurd and Jordan), and in the instruction manual for the Model 4100 Research Potential Controller published by the Anotrol Division of Continental Oil Company, Ponca City, Okla., on July 1, 1963.

Figure 2:
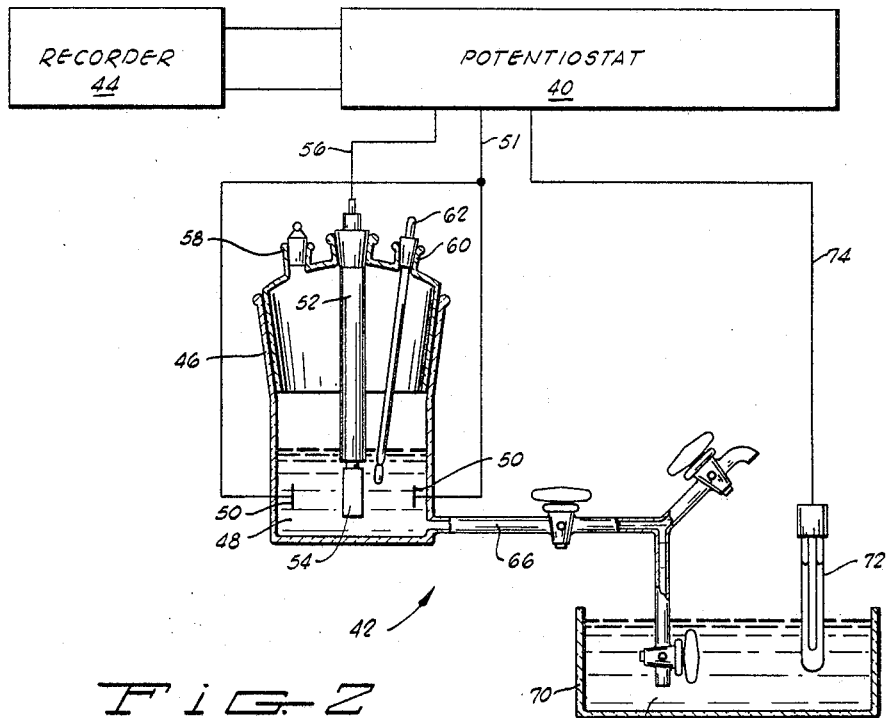
FIGURE 2 is a partially schematic illustration of an electrochemical test cell which can be employed with a suitable potentiostat and recorder for obtaining the polarization curves used in practicing the present invention.

In FIGURE 2, a more detailed schematic illustration of an apparatus suitable for obtaining polarization curves of metallic and alloy coupons is depicted. In this figure, the potentiostat 40, which, as schematically illustrated, includes the control amplifier 22, the potential controller 32 and the current supply 18, is connected to an electrochemical test cell designated generally by reference character 42 with the output from the potentiostat 40 fed to a recorder 44. The recorder 44 is preferably an XY type recorder which can be used to directly record potential versus current, or current density, or it may be a simple strip chart recorder in which either potential difference or current is recorded versus time. The recorder 44 may also be a double pen recorder which simultaneously records both potential difference and current density against time by scribing two traces upon a continuously moving strip chart. Of course, the polarization curve may also be developed by manual plotting of potential difference versus current density if desired.

A test cell 42 which can be employed in obtaining the polarization curves used in the method of the invention includes an inert vessel or container 46 which contains a corrosive electrolyte 48. A pair of inert power electrodes 50 are immersed in the electrolyte 48 and are connected to the potentiostat by a common lead 51. A suitable coupon holder 52 is used to support a coupon 54 of the metal or alloy to be identified in the electrolyte 48, and permit the coupon 54 to be electrically connected to an electrical lead 56. The container 46 is provided with necks 58 and 60 for the accommodation of a thermometer 62 and other device, such as a condenser, stirrer, etc. The container 46 also has a side arm 66 which extends laterally from the bottom thereof to permit the corrosive electrolyte 48 to be placed in electrical communication with a salt bridge solution 68 held in a container 70. A reference electrode 72 of constant potential, such as calomel, is placed in contact with the salt bridge solution 68 and is connected by an electrical lead 74 to the potentiostat 40. If desired, a suitable reference electrode, such as silver-silver chloride, can be immersed directly in the electrolyte 48.

In obtaining polarization curves for use in the practice of the present invention, the metal or alloy coupons are first thoroughly cleaned prior to placement in the apparatus shown in FIGURE 2. A potential difference $V_c$ is then selected which preferably will cause the coupon 54 to be cathodic with respect to the inert power electrodes 50. This initial potential difference is set into the potential control circuitry of the potentiostat 40. The potentiostat 40 then automatically adjusts the potential difference $V_R$ beween the coupon 54 and the reference electrode 72 to conform to or be identical with the potential difference $V_c$ which is preset into the potentiostat. At this time, a certain current will flow in the electrochemical test cell 42 between the inert electrodes 50 and the coupon 54. As previously indicated, it is desirable to commence the polarization runs by applying to the cell a voltage $V_d$ sufficiently negative (active) to cause the coupon 54 to be cathodic with respect to the inert electrodes 50.

The polarization run is then continued by periodically shifting the preset potential $V_c$ in the more noble (positive) direction. For example, preset potential $V_c$ may conveniently be shifted in increments of about 100 millivolts. The current density at the coupon 54 is periodically measured as the actual potential $V_R$ between the coupon and the reference electrodes is shifted to match the preset potential $V_c$ set into the potential circuitry of the potentiostat. At some point during the shift potential, the direction of current flow will reverse and the coupon 54 will become anodic with respect to the inert electrodes 50.

The periodic shifting of the potential difference $V_R$ between coupon 54 and reference electrode 72 in the more noble direction is continued until a sufficient period of time has elapsed and a sufficient number of voltage-current density points have been obtained to permit a distinctive polarization curve to be plotted using either Cartesian coordinates, or on semilog paper. The latter procedure is preferred since the curve is more easily interpreted when this type of plot is constructed. In using the Cartesian coordinate system, however, an XY recorder may be connected to the potentiostat to automatically produce a polarization curve representative of the metal or alloy of which the coupon is constructed.

Either prior to or after the polarization curve is obtained for the unknown metal or alloy which is to be identified, a plurality of polarization curves are obtained for a plurality of metals and alloys of known composition in order to obtain known or standard curves with which the polarization curve of the unknown material may be compared. The known or standard curves are obtained using the same corrosive electrolyte maintained at the same temperature as are used in obtaining the polarization curve for the unknown material. Usually, the broad, general nature of the alloy or metal which is to be identified will be known in advance so that polarization curves of a relatively small number or known materials may be obtained in order to permit the unknown material to be identified. Thus, for example, where it is desired to identify a particular type of stainless steel, several stainless steel coupons of known composition may be placed in the electrochemical test cell and their polarization curves obtained. The polarization curve of the unknown material may then be compared with these curves to determine the composition of the unknown material.

The particular electrolyte which can best be used for obtaining polarization curves for a given family of alloys can be easily determined empirically. For example, I have found that in the case of stainless steels, concentrated sulfuric acid of from about 60 percent by weight to about 98 percent by weight yields good results. In using this electrolyte for stainless steel identifications, electrolyte temperatures of from about 60° F. to about 225° F. may be employed. In general, the polarization runs may be carried out at atmospheric pressure, although occasionally some advantage may be realized by using superatmospheric pressures.

Comparison of the polarization curve of the unknown material with the polarization curves of known materials may be manually and visually effected by superimposing the unknown curve on the curves of the materials of materials of known composition and comparing the degree of coincidence of the unknown curve with the curves of the several known materials. A suitable correlation device, such as the light correlator shown in Piety United States Patent 2,839,149, may also be used for automatically identifying the polarization curve of the known material which most closely resembles the polarization curve representative of the unknown material.

The distinctive nature of the polarization curves which are obtained for alloys of various types may be perceived by referring to the graphs illustrated in FIGURES 3 through 7 of the drawings. In obtaining these polarization curves, descaled coupons of stainless steel were placed in the electrochemical test cell illustrated in FIGURE 2. In the test cell, the coupons were subjected to contact with an electrolyte consisting essentially of 97.5 percent by weight concentrated sulfuric acid at a temperature of 220° F. and at atmospheric pressure.

In the determination of the polarization curves, the coupons were first made cathodic. A series of increasingly noble fixed potentials were then imposed on each of the coupons, and in general, potential versus current density data were taken at three minute intervals at the fixed potentials. The fixed potentials of the coupons were measured relative to a saturated calomel half-cell.

The compositions of the several 300 series stainless steels which yielded the polarization curves shown in FIGURES 3, 4 and 5 are set forth in Table I.

TABLE I

| Alloy | Composition, percent by weight | | | |
|---|---|---|---|---|
| | Carbon | Chromium | Nickel | Molybdenum |
| 304 Stainless Steel | ¹ 0.08 | 18.0–20.0 | 8.0–10.0 | |
| 316 Stainless Steel | ¹ 0.10 | 17.5–19.5 | 8.0–12.0 | 2–3 |
| 317 Stainless Steel | ¹ 0.07 | 18.0–20.0 | ¹ 14.0 | 3–4 |

¹ Maximum.

It will be noted in referring to FIGURES 3, 4 and 5 that the polarization curves which were developed for 304, 316 and 317 stainless steels are quite different from each other, and would easily permit each of these alloys to be distinguished from the others on the basis of the polarization curve obtained. The curve for 304 stainless steel (FIGURE 3) shows a first current density peak near +100 millivolts (noble) and a first potential region of minimum current density between approximately +500 and +1000 millivolts. There is a second current density peak at +1400 millivolts and a second potential region of minimum current density at still more noble potentials. This second current peak has not been observed previously with stainless steels. It is possible that the first potential region of minimum current density corresponds to the formation of the passive metal (W.P.B.) oxide film usually formed on stainless steels, whereas the second potential region of low current density corresponds to the formation of a second, different film, possibly composed principally of the compounds of other metals present in the stainless steel. The general shape of the polarization curve for the 304 stainless steel can then be explained if the anodic polarization curve for the formation of this second film crosses the transpassive region of the first passive film. In any event, because of the particular metallic composition of the several stainless steels, polarization curves having markedly different characteristics are obtained for each of the materials.

In FIGURES 6 and 7 of the drawings, the polarization curves obtained for two stainless steels in the 400 series have been reproduced. The electrolyte employed was 97.5 percent concentrated sulfuric acid maintained at a temperature of 220° F. Although a rough general similarity may be perceived between the two polarization curves of FIGURES 6 and 7, the distinctive features of the curves are much more marked, and permit the curves to serve as a basis for distinguishing the alloys. The metallic compositions of the 410 and 430 stainless steel alloys which yielded the polarization curves shown in FIGURES 6 and 7 are set forth in Table II.

electrode is measured and the electrode is weighed to determine the weight which has been lost through corrosion. In general, the weight loss is expressed in terms of a corrosion rate, thus taking into consideration the time over which the test is conducted.

Table IV lists the corrosion rates for anodically polarized 304, 316, 317, 410 and 430 stainless steel coupons at 220° F. in approximately 97.5 percent by weight sulfuric acid. The passive potentials selected for carrying out the corrosion tests were determined by referring to the polarization curves for these materials illustrated in FIGURES 3 through 7.

TABLE IV

| Stainless steel alloy | Temperature, °F. | Acid concentration range, weight percent | Liquid phase corrosion rate, m.p.y.[1] | Potential, mv.[2] | Current density [3] | | Test duration hours |
|---|---|---|---|---|---|---|---|
| | | | | | ma./sq. in. | ma./sq. ft. | |
| 304 | 220 | 97.2–98.1 | 1.43 | +800 | 0.0087 | 1.2 | 17.5 |
| 304 | 220 | 97.2–98.1 | 9.25 | +1,700 | 0.040 | 5.7 | 21.5 |
| 316 | 220 | 97.2–98.1 | 21.2 | +500 | 0.273 | 39 | 18.5 |
| 316 | 220 | 97.2–98.1 | 10.7 | +1,600 | 0.107 | 15 | 29 |
| 317 | 220 | 97.2–98.1 | 24.3 | +500 | 0.293 | 42 | 26.5 |
| 317 | 220 | 97.2–98.1 | 6.4 | +1,500 | 0.0376 | 5.3 | 18 |
| 410 | 220 | 97.2–98.1 | 21.5 | +500 | 0.130 | 19 | 18.5 |
| 410 | 220 | 97.2–98.1 | 31.1 | +500 | 0.247 | 35 | 15.5 |
| 430 | 220 | 97.2–98.1 | 11.5 | +500 | 0.23 | 33 | 20 |
| 430 | 220 | 97.2–98.1 | 19.2 | +500 | 0.25 | 36 | 18 |

[1] Mils per year.  [2] Noble to saturated calomel (80° F.).  [3] At close of test.

TABLE II

| Alloy | Composition, percent by weight | | |
|---|---|---|---|
| | Carbon | Chromium | Nickel |
| 410 Stainless Steel | [1] 0.15 | 11.50–13.50 | [1] 1.25 |
| 430 Stainless Steel | [1] 0.15 | 16.0–19.0 | [1] 1.00 |

[1] Maximum.

The distinctive nature of the polarization curve of a particular metal or alloy becomes more pronounced as the metallic composition of the alloy differs more markedly from a second alloy. Thus, in the case of 304 stainless steel and a 1020 mild carbon steel, the two polarization curves shown in FIGURE 8 are yielded. The composition of these two alloys is set forth in Table III.

TABLE III

| Alloy | Composition, percent by weight | | | | | |
|---|---|---|---|---|---|---|
| | Carbon | Manganese | Phosphorus | Sulfur | Chromium | Nickel |
| 304 Stainless Steel | [1] 0.08 | | | | 18.0–20.0 | 8.0–10.0 |
| 1020 Carbon Steel | 0.18–0.23 | 0.30–0.60 | [1] 0.040 | [1] 0.050 | | |

[1] Maximum.

It may be perceived in referring to the polarization curves illustrated in the drawings that this characteristic of a metal or alloy may be utilized to identify a particular metal or alloy, or to clearly distinguish the material in question over other materials of generally similar composition.

As hereinbefore indicated, additional data indicative of the identity of a particular metal or alloy can be obtained by determining certain corrosion weight loss and final current density values for the particular metal or alloy of interest. This data is obtained my making the metal or alloy an electrode in an electrochemical cell, and establishing the potential of such electrode relative to a constant potential so that the electrode is maintained in a relatively passive state. Stated differently, the potential of the electrode is adjusted so that minor changes in the potential of the electrode will not result in greatly accelerated corrosion or changes in the current flowing through the electrochemical cell. This passive potential value may be determined by examination of a polarization curve which has previously been obtained for the particular metal or alloy under study. The electrode is then maintained at this passive potential for an extended period of time (say from about 10 to about 24 hours). At the end of this time, the final current density at the As will be noted in referring to Table IV, the 304 stainless steel showed the lowest anodically polarized corrosion rate of 1.4 mils per year (at a passive potential of +800 millivolts), and the final current density for maintaining anodic polarization of this material was 1.2 milliamperes per square foot. In the 400 series alloys, the 430 stainless steel showed a lower corrosion rate than the 410 stainless steel. These alloys differ in composition principally in that the 430 alloy contains a higher percentage of chromium.

In general, the 300 series stainless steels showed lower corrosion rates than the 400 series alloys. The principal difference in the compositions of the 300 and 400 series alloys is the higher nickel content of the 300 series. In the 300 series alloys, the 304 stainless steel showed a lower corrosion rate than either the 317 or 316 alloys. The principal difference in composition between the 304 alloy and the 316 and 317 alloys is the absence of molybdenum in the 304 alloy.

From the foregoing description of the invention, it will be perceived that the present invention provides a rapid and relatively accurate method of identifying metals and alloys without substantial destruction of the material being identified. The method of the invention is particularly useful in permitting members of a closely related family of alloys to be distinguished from each other.

Although the invention has been described with a certain degree of particularity in the examples hereinbefore set forth, it is to be understood that a number of variations and modifications in the specific exemplary procedure set forth may be effected without departure from the basic principles which underlie the invention. It is particularly to be noted that although a determination of both the polarization curve characteristic and the corrosion rate of a metal or alloy may be obtained to afford a more certain identification of the particular alloy under test, the polarization curve alone generally permits identification of the unknown material and may be used alone and without the additional benefit of the corrosion rate test hereinbefore described.

It thus being understood that numerous other arrangements may be devised by those skilled in the art which will embody the basic principles of the invention and fall within the spirit and scope thereof, what I desire to claim is:

1. The method of identifying an unknown metallic specimen which comprises:
   making the metal an electrode in an electrochemical cell containing an electrolyte corrosive to the metal;
   passing a direct current through the electrochemical cell by applying a voltage between the metallic specimen and a second electrode;
varying the applied voltage in increments;
measuring the electrical potential of said electrode relative to a constant electrical potential at each increment;
measuring the current flowing through the cell at each increment;
plotting a polarization curve of the measured potential difference versus the measured current;
repeating the above series of steps with a plurality of known metallic specimens; and
matching said polarization curve of said unknown metallic specimen with polarization curves obtained for a plurality of known metallic specimens whereby such characteristics of said curves as the natural potential and natural current density, the Flade arrest potential, the passive potential region, the transpassive potential region and the magnitude of the current density in the various potential regions are matched and said unknown metallic specimen may be identified.

2. The method in claim 1 and further characterized to include the steps of:
maintaining the potential in the passive region as determined from the polarization curve of the unknown metallic specimen;
determining the rate of weight loss due to corrosion of the metallic electrode in said corrosive electrolyte;
repeating the above series of steps with a plurality of known metallic specimens; and
matching said weight loss rate with that which is characteristic of metallic specimens of known composition in the same electrolyte and at the same temperature and electrical potential relative to said constant electrical potential.

3. A method for analyzing a steel alloy comprising:
making the steel alloy an electrode in an electrochemical cell containing sulfuric acid as an electrolyte in a concentration of from about 50 percent by weight to about 98 percent by weight;
passing a direct current through the electrolytic cell by applying a voltage between the steel alloy and a second electrode in the electrochemical cell while maintaining the temperature of the electrolyte at a substantially constant value in the range of from about 75° F. to about 250° F.;
varying the applied voltage in increment;
measuring the potential difference between said steel alloy and a reference electrode of substantially constant potential at each increment and substantially simultaneously with said potential difference measurements, measuring the current density at the metallic specimen due to the current flowing through the cell;
plotting a polarization curve of potential versus current density;
repeating the above series of steps with a plurality of steel alloys of known composition; and
matching said polarization curve with a plurality of standard polarization curves for steel alloys of known composition obtained by electrolytically polarizing said steel alloys of known composition in said sulfuric acid electrolyte at said constant temperature, whereby such characteristics of said curves as the natural potential and natural current density, the Flade arrest potential, the passive potential region, the transpassive potential region and the magnitude of the current density in various potential regions are matched and said steel alloy is identified.

4. The method claimed in claim 3 and further characterized to include the steps, after obtaining said polarization curve, of:
again making the steel alloy an electrode in the electrochemical cell containing said sulfuric acid while maintaining said acid at substantially the same temperature as that used in obtaining said polarization curve;
adjusting the potential difference of said steel alloy electrode relative to said reference electrode to a value at which said steel alloy electrode is relatively slowly corroded by said acid as determined by said polarization curve;
maintaining the steel electrode at said adjusted potential difference relative to said reference electrode for a period of at least one hour; then
measuring the weight which the steel electrode has lost as a result of corrosion; and
comparing said weight loss measurement with the weight losses of steel alloys of known composition when said alloys of known composition are made electrodes in the same acid, at the same temperature, and at the same potential difference relative to a reference electrode as said steel alloy under analysis.

5. The method of quantitatively analyzing an alloy which comprises:
making the alloy an electrode in an electrochemical cell containing an electrolyte corrosive to the alloy and maintained at a predetermined temperature and pressure;
placing a reference electrode of substantially constant electrical potential in electrical communication with the electrolyte;
passing a direct current through the electrochemical cell by applying a voltage between the alloy and a third electrode immersed in the electrolyte;
varying the applied voltage in increment;
measuring the potential difference between said alloy and said reference electrode at each increment;
measuring the current density at said alloy electrode at the time when said potential difference between said alloy and said reference electrode is measured;
plotting a polarization curve of potential difference versus current density using the measured values of potential difference and current density;
making a plurality of alloys of qualitatively identical composition and of differing known quantitative compositions electrodes, of the same polarity as the first mentioned alloy, in a plurality of other electrochemical cells corresponding in number to said plurality of alloys and containing said electrolyte with said electrolyte being maintained at substantially the same temperature and pressure in each of said plurality of cells as in the electrochemical cell containing the alloy to be quantitatively analyzed;
placing one of said reference electrodes of substantially constant electrical potential in each of the electrochemical cells containing said alloys of differing known qualitative compositions;
passing a direct current through each of the electrochemical cells containing each of said plurality of alloys by applying a voltage between the alloy therein and a third electrode disposed therein;
varying the applied voltage in increments;
measuring the potential difference between each of said plurality of alloys and the reference electrode in the electrochemical cell containing each of said plurality of alloys at each increment;
measuring the current density at each of said plurality of alloys at the time when said potential difference between each of said plurality of alloys and the reference electrode in the cell containing each of said plurality of said alloys is measured;
plotting a polarization curve for each of said plurality of alloys; and
matching the polarization curves, with respect to the natural current density, the Flade arrest potential, the passive potential region, the transpassive potential region and the magnitude of the current density in the various potential regions, for the pluarlity of alloys of known quantitative composition with the polarization curve obtained for the alloy to be quantitatively analyzed.

References Cited
UNITED STATES PATENTS
| | | | |
|---|---|---|---|
| 1,942,046 | 1/1934 | Bottome | 204—195 |
| 2,531,747 | 11/1950 | Stearn | 204—195 |
| 3,034,050 | 5/1962 | Vann Yuen | 204—195 |
| 3,282,804 | 11/1966 | Stearn | 204—195 |

OTHER REFERENCES
Blum et al.: "Trans. of the Am. Electrochemical Soc.," vol. 52, 1927, pp. 403, 404, 411–418, 422–426.

JOHN H. MACK, *Primary Examiner.*

T. TUNG, *Assistant Examiner.*

U.S. Cl. X.R.

204—195; 324—29